United States Patent [19]

Iwamoto et al.

[11] Patent Number: 4,637,686
[45] Date of Patent: Jan. 20, 1987

[54] OPTICAL FIBER WITH LIGHT REFLECTING PARTICLES DISPERSED THROUGH BUFFER LAYERS TO DISSIPATE LEAKY CLADDING MODES

[75] Inventors: Yoshinao Iwamoto, Fujimi; Yuichi Shirasaki, Tokyo; Masayuki Fujise, Ebina; Kenichi Asakawa, Hachiohji, all of Japan

[73] Assignee: Kokusai Denshin Denwa Co., Ltd., Tokyo, Japan

[21] Appl. No.: 597,666

[22] Filed: Apr. 6, 1984

[30] Foreign Application Priority Data

Apr. 8, 1983 [JP] Japan ................................ 58-60798

[51] Int. Cl.$^4$ .......................... G02B 6/02; G02B 6/16; F21V 7/04
[52] U.S. Cl. ............................... 350/96.29; 350/96.10; 350/96.30; 350/96.33; 362/32
[58] Field of Search ............... 350/96.10, 96.15, 96.20, 350/96.29, 96.30, 96.33, 96.34; 362/32; 356/335, 336, 337, 338, 339, 342

[56] References Cited

U.S. PATENT DOCUMENTS

| 4,195,907 | 4/1980 | Zamja et al. | 350/96.32 |
| 4,422,719 | 12/1983 | Orcutt | 350/96.30 |
| 4,471,412 | 9/1984 | Mori | 362/32 |
| 4,482,204 | 11/1984 | Blyler, Jr. et al. | 350/96.30 |
| 4,516,022 | 5/1985 | Lindgren | 250/227 |
| 4,519,017 | 5/1985 | Daniel | 362/32 |
| 4,575,181 | 3/1986 | Ishikawa | 350/96.20 |

FOREIGN PATENT DOCUMENTS

| 52-12845 | 1/1977 | Japan | 350/96.29 |
| 57-207204 | 12/1982 | Japan | 350/96.29 |

Primary Examiner—William L. Sikes
Assistant Examiner—Brian M. Healy

[57] ABSTRACT

This invention aims to provide an optical fiber which is capable of sufficiently dissipating the leaky mode in the cladding thereof characterizing in those particulate substances such as minute hollow glass beads having different refractive indices are sealed in the primary buffer layer or on the boundary between the primary buffer layer and the cladding, or between the primary and secondary buffer layers of the optical fiber, whereby nucleous elements for scattering or absorption can be formed uniformly.

5 Claims, 3 Drawing Figures

OPTICAL FIBER WITH LIGHT REFLECTING PARTICLES DISPERSED THROUGH BUFFER LAYERS TO DISSIPATE LEAKY CLADDING MODES

BACKGROUND OF THE INVENTION

This invention relates to an improvement on an optical fiber, and more particularly it aims to more effectively dissipate the leaky mode in the cladding by substantially and uniformly sealing particulate substances such as minute hollow glass beads having a refractive index different from that of the primary buffer layer in the primary buffer layer, or on the boundary between the cladding and the primary buffer layer adjacent, to or between the primary and secondary buffer layers to thereby subject the leaky mode to scattering or absorption.

Generally, the fundamental requirements of the primary buffer layer of an optical fiber are; (1) capable of removing the leaky mode; (2) effective as a buffer against lateral pressure; (3) capable of securing the strength of the optical fiber; and (4) can be easily peeled off for connecting operation. Modified silicon, having a refractive index greater than that of the cladding, is usually used as the material for primary buffer. It is known that a buffer, having a refractive index greater than 1.47, is capable of sufficiently removing the leaky mode, and that a marked decrease in strength occurs when the film thickness becomes less than 25 $\mu$m, whereas the strength will be stabilized at the film thickness of 35 $\mu$m or higher.

A silicon layer having a high refractive index is considered adequate for an elongated optical fiber in terms of leaky mode elimination. However, when the optical fiber is several meters in length, the leaky mode can not be transmitted completely, but instead it is transmitted and partially emitted together with the guided mode from the forward output end of the fiber. Such transmissions of the leaky mode cause fluctuation in the level of output light at the end, distortion in the waveform due to mode dispersion, waver in the plane of polarization and/or deterioration in the polarization, posing difficulties in application of precision measurement systems and optical fiber sensors or in connection to optical devices that are highly dependent on polarization. It is necessary with a single mode optical fiber to align the axes of the cores when two such optical fibers are connected. It is therefore necessary to closely monitor the light leaking in the vicinity of the point where the fibers are connected in abutment so that such leakage of light can be minimized by adequate adjustment of the core axes.

In such a case, the leaking light in the prior art tends to attenuate gradually along the longitudinal direction of the optical fiber. Because the nuclei for scattering are distributed at random due to inconsistency in the refractive index present in the cladding, primary buffer layer and boundary between them the detected level of leaky mode shows fluctuation depending on the location in the longitudinal direction of the optical fiber, as shown in FIG. 1. This makes it difficult to obtain a sufficiently stable level of leaky mode at a predetermined location from the point where the optical fibers are connected in abutment.

SUMMARY OF THE INVENTION

This invention has been contrived to overcome the problems encountered in the prior art and aims to provide an optical fiber which will enable the leaky mode to be sufficiently dissipated by the structure which is characterized in that particulate substances made of minute hollow glass beads having different refractive indices sealed in the primary buffer layer and the boundary between the cladding or the primary buffer layer or between the primary and secondary buffer layers, so that nuclei for scattering or absorption can be uniformly provided.

DETAILED DESCRIPTION OF THE PREFERRED EMBODIMENT

The present invention optical fiber will now be described in more detail referring to the embodiments shown in FIGS. 2 and 3.

Figure 1:
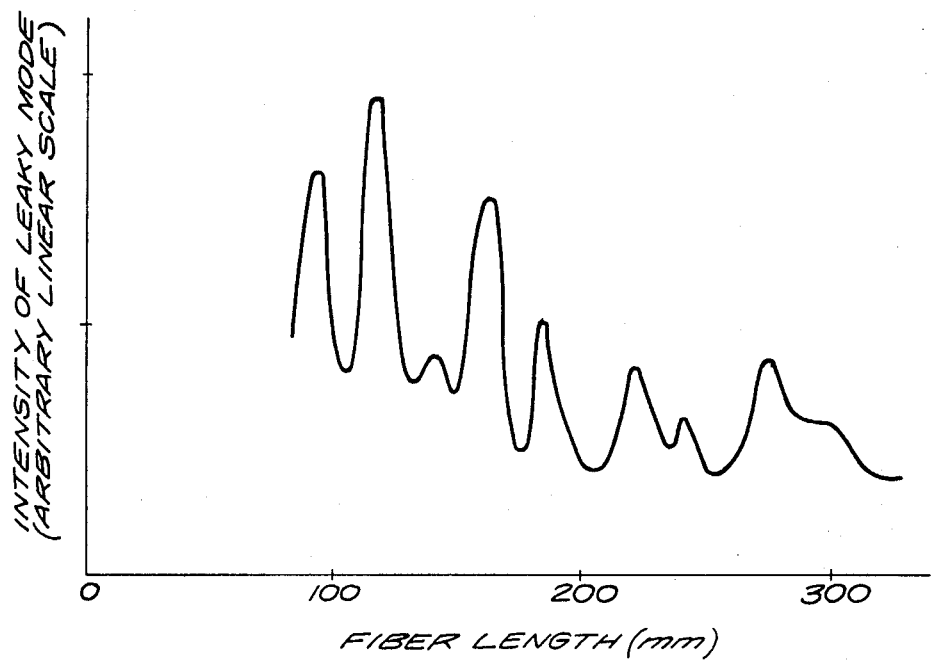
FIG. 1 is a graph showing the distribution of the intensity of leaky mode in the cladding in the conventional optical fiber.
Figure 2:
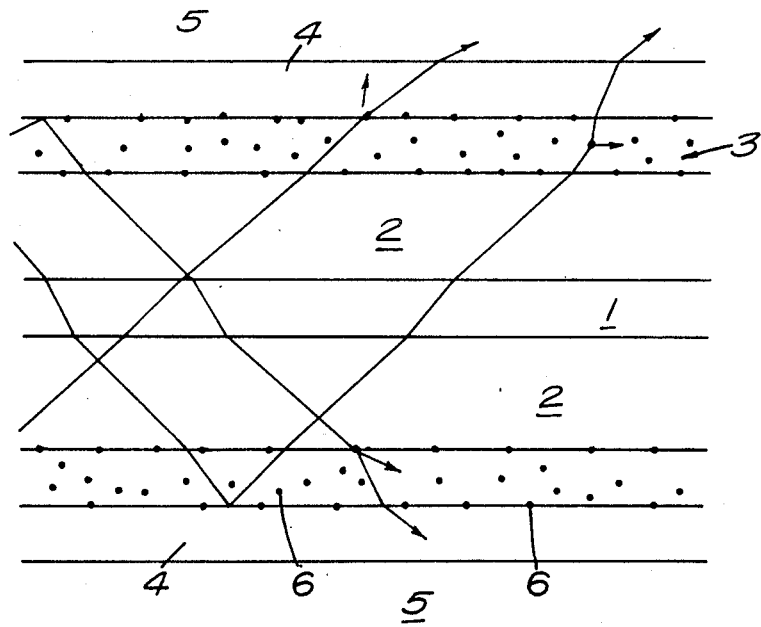
FIG. 2 is an explanatory view showing how the leaky mode in the cladding of the optical fiber according to the present invention is dissipated.

FIG. 2 shows how the leaky mode in the cladding of the optical fiber according to the present invention is dissipated: the reference number 1 denotes a core, 2 a cladding, 3 a primary buffer layer, 4 a secondary buffer layer, 5 a coating layer and 6 particulate substances which constitute the nuclei for scattering or absorption to be described here in more detail. The optical fiber according to the present invention seals minute particulate substances such as very small hollow glass beads 6 in the primary buffer layer, or on the boundary between the primary and secondary buffer layers 3 and 4, or between the primary buffer layer 3 and the cladding 2. The presence of such substances acts to make the boundary plane of the primary buffer layer 3 uneven or provides uniformly distributed nuclei for substantially scattering or absorption within the primary buffer layer 3.

The optical fiber according to the present invention can be fabricated by the following process. A preform prepared in accordance with the MCVD method or the VAD method is treated by spinning to obtain a fiber of desired configuration. The fiber is coated concurrently during spinning. In case the glass beads 6 are to be sealed in the primary buffer layer 3 or on boundary between the primary and secondary buffer layers 3 and 4, or between the primary buffer layer 3 and the cladding 2, such glass beads are blended and uniformly dispersed in advance into the molten matrix of silicon or urethane which is the material for the primary buffer. The mixture is used as a coating to be applied immediately after spinning of the preform.

The refractive index of the primary buffer layer 3 in the optical fiber thus obtained is higher than that of the cladding 2; thus, the leaky mode is transmitted, even in the primary buffer layer so that the leaky mode may be subjected to scattering or absorption by the particulate substances 6. The light excited in the form of the leaky mode is either dissipated or absorbed within a short distance of the optical fiber and whereby the amount of leaky mode transmitted as far as to the forward tip of the optical fiber is minimized. The resilience of the particulate substances 6 which are hollow microstructures made of bubbles or soft film also acts to enhance the buffer effect.

Figure 3:
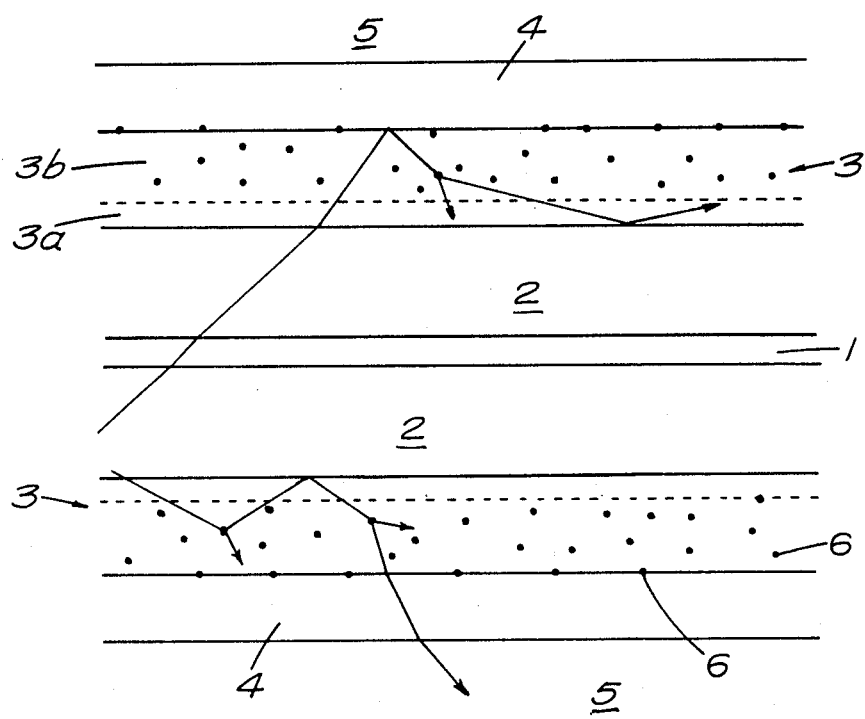
FIG. 3 shows another embodiment of the optical fiber according to the present invention.

The second embodiment shown in FIG. 3 contains minute particulate substances 6 sealed in the primary buffer layer and on the boundary between the primary and secondary buffer layers. In this embodiment, a portion of the light scattered by the minute substances 6 is reflected on the boundary of the cladding 2 having a smaller refractive index, as shown in FIG. 3. The light thus reflected will be transmitted in the primary buffer layer 3 again and caused to be scattered and leaked by the nuclei for scattering.

According to the present invention, coating of the primary buffer layer 3 during the spinning process is conducted in two stages; i.e. the inner surface 3a of the buffer layer 3 is first coated with a material which contains no particulate substances 6, and then the outer surface 3b is coated with a material which is uniformly blended with particulate substances 6.

As has been described above with reference to the accompanying drawings, the optical fiber according to the present invention contains particulate substances such as minute hollow glass beads having different refractive indices in the primary buffer layer, or on the boundary between the cladding and the primary buffer layer, or between the primary and secondary buffer layers so as to provide substantially uniformly distributed nuclei for scattering or absorption. The present invention is thus advantageous in that the leaky mode in the cladding can be easily scattered to be leaked out and that the presence of the hollow particles made of bubbles or soft film will improve the buffer performance against the lateral pressure.

What is claimed is:

1. An optical fiber structure comprising a central optical core surrounded by cladding, primary buffer, and secondary buffer layers in that order, and wherein a particulate light reflecting material is uniformly dispersed throughout said primary buffer layer to form nuclei which dissipates light leaking out of the cladding layer.

2. A structure according to claim 1 wherein said particulate material is also uniformly dispersed along the boundary between and formed by the primary and secondary buffer layers and along the boundary between and formed by the primary buffer and cladding layers.

3. An optical fiber structure comprising a central optical core surrounded by cladding, primary buffer and secondary buffer layers in that order, and wherein a particulate light reflecting material is uniformly dispersed along the boundary between and formed by the primary and secondary buffer layers to form nuclei which dissipates light leaking out of the cladding layer.

4. An optical fiber structure comprising a central optical core surrounded by cladding, primary buffer and secondary buffer layers in that order, and wherein a particulate light reflecting material is uniformly dispersed along the boundary between and formed by the primary buffer and cladding layers to form nuclei which dissipate light leaking out of the cladding layer.

5. A structure according to claim 1, wherein said particulate material comprises small, hollow glass beads.

* * * * *